United States Patent [19]
Reed et al.

[11] Patent Number: 4,939,731
[45] Date of Patent: Jul. 3, 1990

[54] DATA TRANSMISSION SYSTEM WITH AUTOMATIC REPEAT REQUEST

[75] Inventors: Allyson Reed, Northmoor; Jonathan N. Hopkinson, Totton, both of United Kingdom

[73] Assignee: Plessey Overseas Limited, Ilford, England

[21] Appl. No.: 220,214

[22] PCT Filed: Nov. 19, 1987

[86] PCT No.: PCT/GB87/00821
§ 371 Date: Sep. 29, 1988
§ 102(e) Date: Sep. 29, 1988

[87] PCT Pub. No.: WO88/04496
PCT Pub. Date: Jun. 16, 1988

[30] Foreign Application Priority Data
Dec. 2, 1986 [GB] United Kingdom .............. 8628821

[51] Int. Cl.$^5$ .................................................. G06F 11/10
[52] U.S. Cl. .................................... 371/32; 371/5.5
[58] Field of Search .............. 371/5.5, 5.1, 5.3, 37.1, 371/32, 33

[56] References Cited

U.S. PATENT DOCUMENTS

| | | | |
|---|---|---|---|
| 3,878,333 | 4/1975 | Shimizu | 371/5.5 |
| 4,110,558 | 8/1978 | Kageyama et al. | 178/69.1 |
| 4,270,205 | 5/1981 | DeShon | 371/32 |
| 4,541,091 | 9/1985 | Nishida | 371/5.5 |
| 4,589,111 | 5/1986 | Adachi | 371/5.5 |
| 4,720,829 | 1/1988 | Fukasawa | 371/5.5 |
| 4,736,388 | 4/1988 | Eguchi | 371/5.5 |

FOREIGN PATENT DOCUMENTS

| | | |
|---|---|---|
| 0039191 | 11/1981 | European Pat. Off. . |
| 0154565 | 9/1985 | European Pat. Off. . |

OTHER PUBLICATIONS

"Networked Meteor Burst Data Communications", by K. J. Kohjev et al., IEEE Communications Magazine, Vol. 24, No. 11, 11/86 (New York), pp. 23-29.

*Primary Examiner*—Michael R. Fleming
*Attorney, Agent, or Firm*—Fleit, Jacobson, Cohn, Price, Holman & Stern

[57] ABSTRACT

A data transmission system comprising a plurality of radio stations, each station including a transceiver with associated encoding/decoding means for transmitting/receiving data, wherein data signals are transmitted as packets including one or more blocks of data encoded with an error correcting code, wherein each station is arranged automatically to issue a request for repeat of a packet of data should it receive a packet containing errors which cannot be corrected, and wherein should the error rate in received packets be more than a predetermined amount over a predetermined interval of data transmission, the system is arranged automatically to reduce the rate of data transmission within each packet and/or change the channel frequency.

10 Claims, 4 Drawing Sheets

DATA TRANSMISSION SYSTEM WITH AUTOMATIC REPEAT REQUEST

CROSS-REFERENCES TO RELATED APPLICATIONS

Reference is hereby made to copending U.S. application Ser. No. 07/220,211 to Reed et al. and copending U.S. application Ser. No. 07/220,213 to Goodwin, both assigned to the assignee of the present application.

FIELD OF THE INVENTION

The present invention relates to data transmission in an HF transmission system and in particular to a data transmission protocol.

BACKGROUND ART

HF is generally recognized as the frequency range 2-30 MHZ. For the purposes of this specification the term is intended to cover any frequency up to 30 MHZ and may include frequencies above 30 MHZ. The term is intended to designate a type of radio transmission usually involving ionospheric reflection, from the F-layer, the maximum usable frequency usually being somewhat less than 30 MHZ.

Commercial and military systems are known employing HF transmission between a large number of ground stations. For example, an army may possess portable transceivers carried on vehicles or as "man-packs" which rely on HF data transmission. Because of the nature of HF transmissions, usually involving ionospheric reflection, there is a high probability of errors in data transmission caused by bursts, rapid fading and gaussian noise. Further since a military system will be required to operate in all conditions and any geographic location, e.g. the Arctic circle, where disturbed ionospheric conditions of propagation may exist, these causes of transmission error may be compounded.

SUMMARY OF THE INVENTION

It is therefore an object of the invention to provide a data transmission protocol for data transmission in HF telecommunications systems which is reliable and can adapt to changing transmission conditions.

The invention provides in one aspect a data transmission system comprising a plurality of radio stations, each station including a transceiver with associated encoding/decoding means for transmitting/receiving data, wherein data signals are transmitted as packets including one or more blocks of data encoded with an error correcting code, wherein each station is arranged automatically to issue a request for repeat of a packet of data should it receive a packet containing errors which cannot be corrected, and wherein should the error rate in received packets be more than a predetermined amount over a predetermined interval of data transmission, the system is arranged automatically to reduce the rate of data transmission within each packet and/or change the channel frequency.

The invention provides in a further aspect a method of data transmission between a plurality of radio stations, each station including a transceiver with associated encoding/decoding means for transmitting/receiving data, the method comprising:

a first station transmitting data signals as a data packet to one or more receiving stations, the packet including one or more blocks of data each encoded with an error correcting code, a receiving station receiving and decoding the transmitted data packet and transmitting an acknowledgement signal with a request for retransmittal of data should the packet contain more errors than can be corrected, and the receiving station transmitting to the first station a request for change of data transmission rate and-/or channel frequency should the error rate in the received packets be more than a predetermined amount over a predetermined interval of data transmission.

The invention provides in a further aspect apparatus for data transmission comprising a plurality of radio stations, each station including a transceiver with associated encoding/decoding means for transmitting-/receiving data, wherein each station includes:

means for forming data packets for transmissions, each packet including one or more blocks of data each encoded with an error correcting code, means for decoding transmitted data packets and for correcting detected errors, and means for transmitting an acknowledgement signal with a request for a repeat of a data packet should errors not be correctable, and means for assessing the error rate in received data packets and for issuing a request in the acknowledgement signal for a change in data transmission rate and-/or channel frequency should the error rate be more than a predetermined amount for a predetermined interval.

Thus in accordance with the invention measures are provided for corrections of errors with received data packets, but if these errors are above a predetermined level leading to conditions in which transmitted data may not be recovered, then the system is arranged automatically to choose a data rate which is lower thus enabling a clearer reception, or alternatively to switch to another channel frequency which is determind to be more free from interference and/or noise. Thus in practice when the system initialises data transmission, a radio station will choose a data rate which is the highest compatible with the noise and interference levels which have previously been determined as present on the communication channel frequency selected by the station. If during transmission the error rate increases because of increased noise levels more than can be dealt with by error correcting codes and repetition of data packets, then the receiving station may signal to the transmitting station to change data rate to enable clearer determination of received data. If however the error rate is still unacceptably high (or if it was clear that the error rate could not be contained by lowering the data transmission rate) then the channel frequency may be changed to a value which has previously been determined as acceptable in terms of noise levels.

It will be understood that the system of this invention may be employed in the context of a network control system described in copending U.S. application Ser. No. 07/220,213 and a system for automatic selection of acceptable channel frequencies disclosed in copending U.S. application Ser. No. 07/220,211.

In addition to he measures forth above, further protection against burst errors may be provided by interleaving two or more blocks of data within each packet of data so that should burst errors occur these will be spread equally over the interleaved blocks so that the blocks may nevertheless be recoverable.

As preferred, the blocks are encoded with a Golay perfect code. This is a known technique and has been found particularly suitable with the present invention as offering a compromise between power at correction of error whilst not being an unreasonably long code. However other block encoding techniques may be employed capable of error correction.

BRIEF DESCRIPTION OF THE DRAWINGS

A preferred embodiment of the invention will now be described with reference to the accompanying drawings wherein.

DESCRIPTION OF THE PREFERRED EMBODIMENT

The HF data transmissions system of the present invention employs a technique for network control which is described in copending U.S. application Ser. No. 07/220,213. Briefly this involves each radio station contending over predetermined control channel frequencies for network control, and control being assigned to the station with a highest preallocated priority. During the initialisation control procedure, a 'pool' of frequency channels are automatically determined which have relatively low levels of noise and interference, and from this pool a radio station wishing to transmit selects a channel frequency. For each channel frequency selected, one or more reserve channels are nominated should the channel frequency become unusable. The method of automatic frequency determination is described in copending U.S. application Ser. No. 07/220,211.

Figure 1:
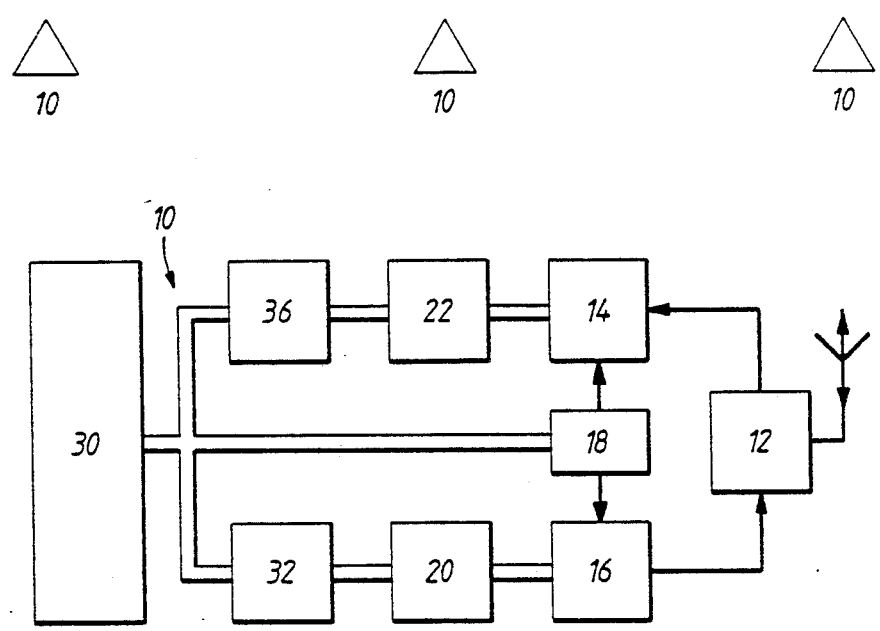
FIG. 1 is a schematic view of an HF data network with a plurality of radio stations.

A network of radio stations for HF data communication is shown in FIG. 1, each station being schematically indicated as at 10. Each station is of identical construction and comprises an aerial 12 coupled to a receiver 14 and transmitter 16. The receiver and transmitter are coupled to an oscillator 18 which may synthesize the frequencies allocated for transmission.

Figure 2:
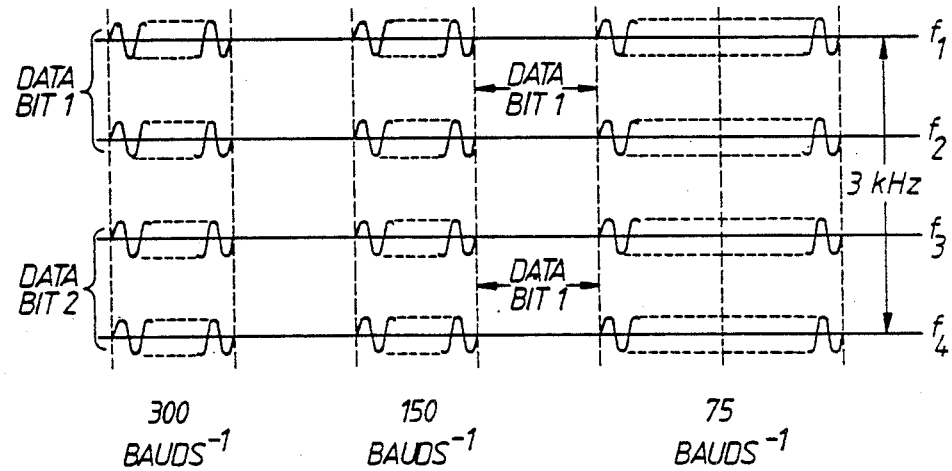
FIG. 2 is a diagram of FSK modulated signals formed in the present invention.

A data buffer/modulator 20 provides frequency shift keyed (FSK) modulated signals to transmitter 16 and a data buffer/demodulator 22 demodulates received FSK signals from receiver 14. The form of FSK modulation is shown in FIG. 2. At the highest transmission rate used in the system 300 bauds$^{-1}$, each data bit is represented within each modulation interval by one pair of two pairs of tones spanning a 3 KHZ bandwidth. Thus it is possible to transmit two bits of data within each time interval. For a slower data rate of 150 bauds$^{-1}$ each data bit is duplicated in the two separate pairs of tones within each time interval, thus increasing the inband diversity and lowering the probability of error. For the slowest data rate used in the system, 75 bauds$^{-1}$, the two separate pairs of tones representing a single data bit are lengthened to occupy two modulation times intervals.

Data provided by data processor 30 is subject to an encoding technique in encoder 32 prior to modulation, which is described in more detail below. Similarly data receivd in receiver 14 and demodulated as at 22 is decoded 36 prior to processing in processor 30.

Figure 3:
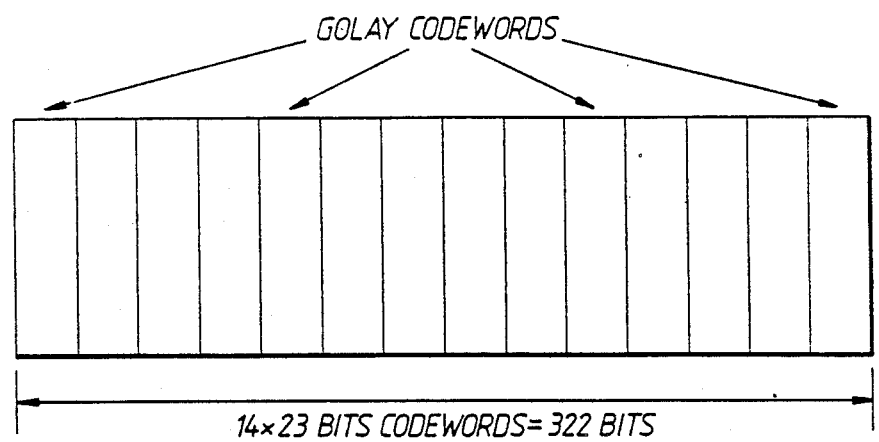
FIG. 3 is a diagram of Data R-block which forms the basic unit of a packet of data to be transmitted in a data protocol according to the invention.

The encoding technique will now be described in more detail with reference to FIG. 3 which shows data encoded into an R-block (repetition block) for transmission to one other station (Single Address Message-SAM). the error correcting code chosen is the Golay (23, 12) perfect code which is described in W. W. Peterson "Error Correcting Codes", John Wiley, and Clarke and Bibbcain "Error Correction Coding for Digital Communications", Plenum.

For SAM transmission, the message data is encoded at the source for error protection using the Golay (23, 13) perfect block code. A Golay codeword is an error correcting code well known in this art, the codeword comprising a 23 bit code of 12 data bits and 11 parity check bits. Using this code to correct 2 error bits and detects 3 or more error bits per codeword, it is possible to obtain a character (7 bits) error rate of less than 1 in $10^4$ at a bit error rate of 3%.

Figure 4:
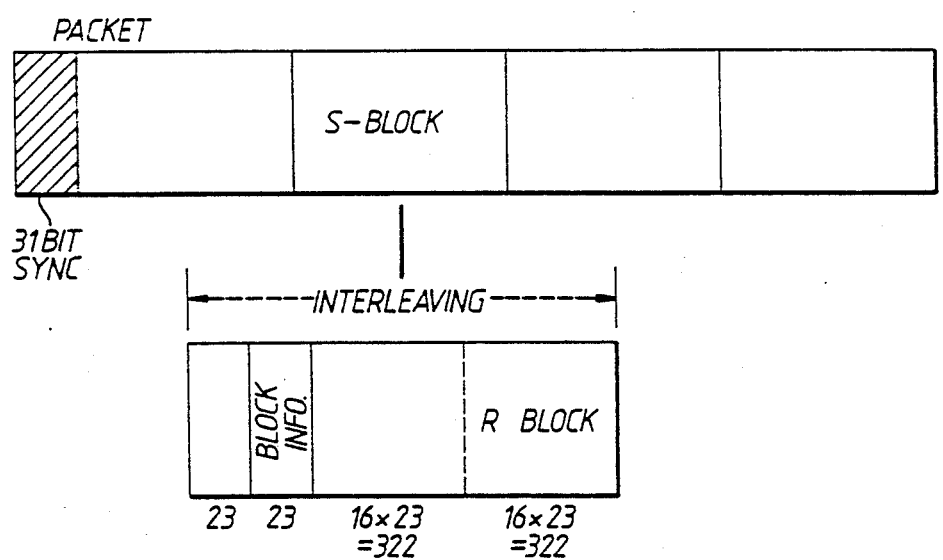
FIG. 4 is a diagram of a packet of data comprised of a plurality of concatenated S-blocks, each S-block being formed of a plurality of interleaved R-blocks.

The codewords are divided into numbered R-blocks (Repetition blocks) which are the smallest units repeated in ARQ. An R-block consists of 14 codewords, FIG. 3. Two R-blocks are concatenated with two further codewords to create an S-block (send block). The first extra codeword contains the source address (8 bits) plus 4 flag bits. The second contains two 6 bit labels which refer to the two R-blocks. During transmission a data bit interleaving scheme is employed over each S-block (690 bits), FIG. 4.

To minimise the overhead associated with the ARQ response, the forward transmission (Packet) consists of several S-blocks, the exact number depends on the baud rate in use. In addition the forward packet begins with a 31 bit synchronisation sequence.

Figure 5:
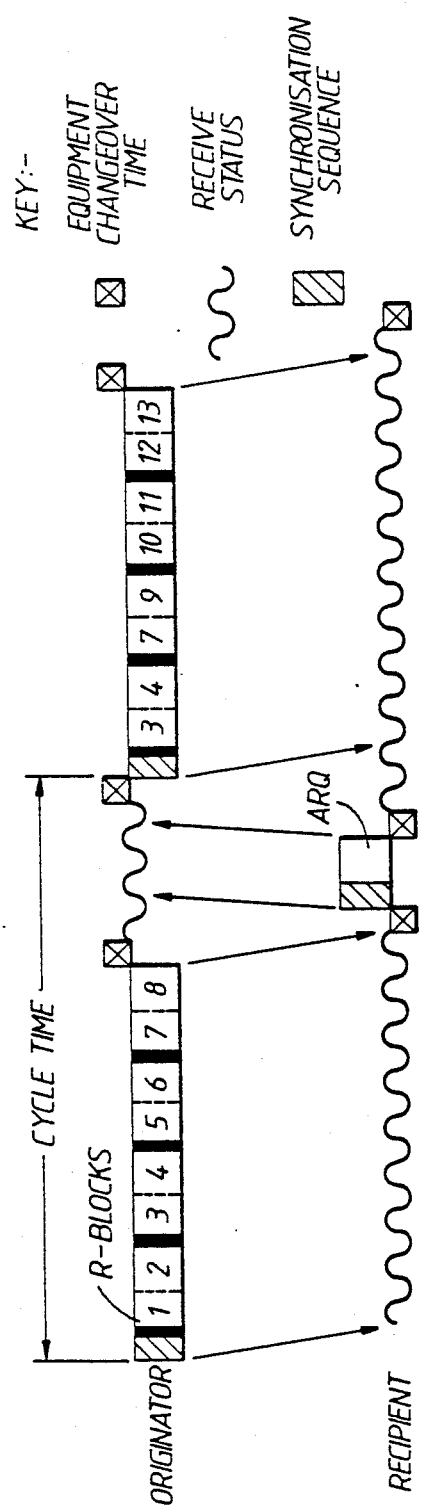
FIG. 5 is a diagram showing the issuance of automatic repeat requests (ARQ) in a fixed cycle of operation.

Each packet requires individual acknowledgement by the receiving station. In the recipient's reply (ARQ block), the individual R-blocks are acknowledged (effectively by number), and only those in error are retransmitted in the next, constant length packet; the remainder of the packet contains new blocks. If the ARQ packet is corrupted or lost, all blocks are repeated. If the forward packet is not received by the destination, an ARQ packet requesting all repeats is transmitted. To prevent a possible collision between forward packets and ARQ packets, there is a fixed cycle time between each transmission at both the source and destination stations, FIG. 5.

Figure 6:
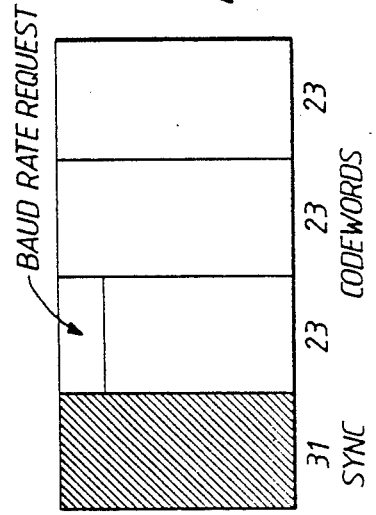
FIG. 6 is a diagram of the components of an automatic repeat request block.

The use of error correction and detection enables a quantitative assessment of the channel to be made. This information is used by the recipient to request data rate changes and, possible, a channel change. Changes in baud rate are initiated only by the destination station, and signalled in an ARQ packet, FIG. 6. Although the baud rate request is shown in this example in the first codeword following the synchronisation block, the request may be contained in any one of the codewords depicted. Each forward packet is transmitted at the last requested baud rate in a a received ARQ packet. Message transmission commences at a predetermined baud rate, which is known to both stations. To maximise throughput, the baud rate is increased on a good (low error) channel and decreased on a poor (high error) channel. The recipient will request a lowering of the data rate automatically if the quality factor of received blocks is consistently less than a predetermined threshold. If with the lowest data transmission rate, the quality factor is consistently less than the threshold value, then a change to another frequency channel will be requested. The change of frequency channel will be requested in the first codeword in a similar manner to baud rate request, and a change will be made to a nominated reserve channel.

Figure 7:
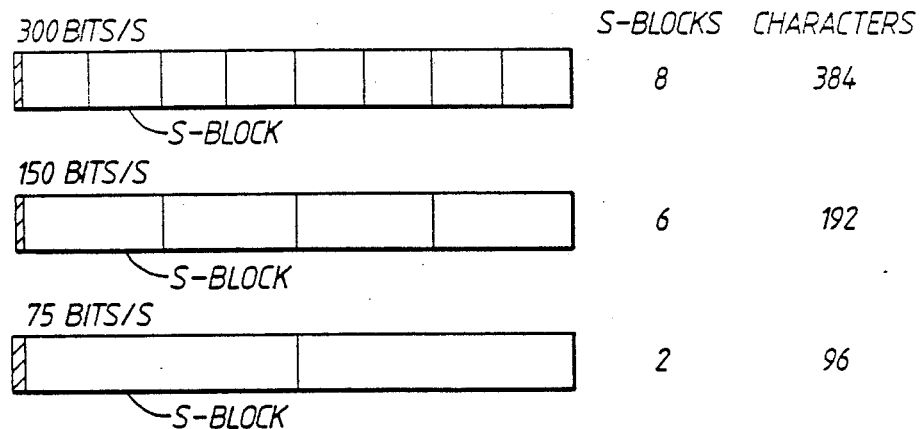
FIG. 7 is a diagram of the components of packets for different baud rates.

For example, traffic transmission may commence at 150 baud but, depending upon prevailing conditions, this can then be changed to 75 baud or 300 baud at the recipient's request. ARQ transmissions always use 75 baud data rate. To maintain forward packet lengths of 20 s—which can be shown theoretically to be optimum—the number of S-blocks per packet changes with baud rate. There are two S-blocks per packet at 75 baud, four at 150 baud and eight at 300 baud, FIG. 7.

The numbering of each R-block enables the recipient to interpret the received data correctly and so reconstruct the message exactly, even if the channel has been disturbed or faded for a long period. A quality factor is assigned to each received S-block based on a function of the number of codewords corrected and the number of bits in error in that S-block. If the quality factor is worse than a predefined threshold then both R-blocks contained in that S-block are rejected, and a repeat requested. The R-blocks are otherwise stored, but an R-block repeat is still requested if it contains a codeword with uncorrectable errors.

An overlay technique is employed to improve the probability of forming an error free block should an R-block be repeated, whether requested or not. If the repeat R-block has a better quality factor than the equivalent stored R-block, any of its codewords containing uncorrectable errors are replaced with the corresponding codewords from the stored R-block. Otherwise, the uncorrectable codewords of the stored R-block are replaced with those from the repeat R-block. If the resultant R-block is error free it is accepted. Otherwise, it replaces the stored R-block in the buffer and a further repeat is requested. This process is continued until the message is received in its entirety.

MAM (Multiple Address Message) transmissions use a similar modular framework to the SAM transmissions (described above) with some tailoring to maintain efficient throughput for multiple addresses.

Figure 8:
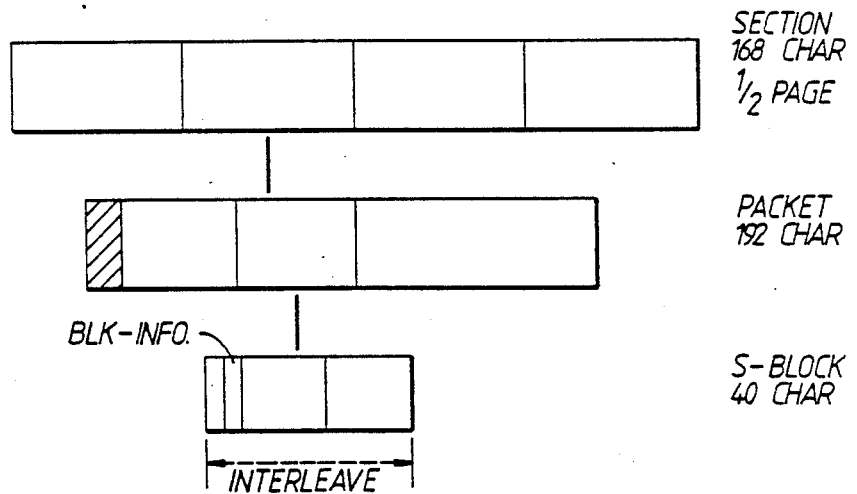
FIG. 8 is a view of the component parts of a data packet for multiple address messages wherein the packet is broadcast to a number of radio stations.

The message to be sent is encoded and divided up in to a number of sections, each of which consists of four concatenated SAM packets, including the synchronisation sequences. For instance, at 150 baud, a MAM section consists of 16 S-blocks with four synchronisation sequences, FIG. 8.

After each section is transmitted, ARQ packets are collected from each recipient in a predetermined order. Due to the large forward packet size, MAM ARQ packets acknowledge S-blocks and not individual R-blocks. As a result, the S-block header format differs from that for SAM packets in that the two 6 bit R-block labels are replaced by an 8 bit S-block together with 4 check bits.

Having received the ARQ packets from the destination stations, the source is able to compile a list of S-blocks to be repeated. If an ARQ packet is not detected (e.g. due to interference) all S-blocks in the previous section are added to the repeat list. The repeat lists are held by the source until all sections of the message have been transmitted. The requested repeats are then transmitted in the same format as the message transmissions. Further repeat requests are collected after each section. After the first repeat transmissions have been completed, the source continues to service repeat requests from destinations requesting not more than 50% of the message. Up to 3 repeats of each S-block are permitted, except that if the number of requested blocks is less than the number of blocks available in the section to be transmitted the spare blocks are filled with additional repeats of the requested S-blocks. If the source location fails to detect an expected ARQ during the repeat phase, S-blocks transmitted in the previous section shall be automatically retained in the list for a further repeat only if they were previously requested by the destination concerned.

Transmission is continued in this manner until no further repeat requests are made (within the criterial outlined above).

We claim:

1. In an HF radio communication system for transmitting data comprising a plurality of radio stations, each station including a transceiver with associated encoding/decoding means for transmitting/receiving data, the method comprising the steps of:
(A) providing each radio station with a plurality of predetermined channel frequencies for transmission which have acceptable levels of noise and interference, and providing each such channel frequency with a predetermined reserve channel frequency to which transmission may be changed;
(B) transmitting data from a first of said radio stations on one of said predetermined channel frequencies in the form of a data packet, said packet including one or more blocks of data encoded with an error correcting code;
(C) receiving and decoding the transmitted data packets at a second of said radio stations and correcting errors, and automatically transmitting a request to said first station for retransmitting of a data packet should it be received with more than a predetermined number of errors;
(D) determining the error rate at said second radio station in received data packets;
(E) transmitting a request to said first radio station from said second radio station to reduce the rate of data transmission if the error rate is greater than a predetermined amount over a predetermined time interval of data transmission; and
(F) transmitting a request to said first radio station from said second radio station to change the channel frequency to said predetermined reserve channel frequency if said step of transmitting a request to said first radio station to reduce the rate of data trasmission does not reduce the error rate below said predetermined amount.

2. A method according to claim 1 and further comprising the step of transmitting each data bit of a block of data by frequency shift keying modulation of the carrier wave.

3. A method according to claim 2 wherein each bit is transmitted as two tones of a multitone system.

4. A system according to claim 3, and further comprising the steps of simultaneously transmitting four tones for permitting simultaneous transmission of two bits of data at a first data rate, and duplicating each bit in the other pair of tones to provide transmission of data at a second slower data rate.

5. A method according to claim 1 and further including the step of providing each block of data with a plurality of codewords, each codeword being encoded in a Golay perfect code wherein (n) bits of data are accompanied by (m) parity bits.

6. A method according to claim 1 and further including the steps of concatenating two or more blocks of data and interleaving the bits of the data in each block.

7. A method according to claim 6 wherein each packet of data comprises a plurality of groups of said concatenated blocks.

8. A method according to claim 1, and further comprising the steps of transmitting an acknowledgement signal for each received data packet within a fixed time interval from said second station to said first station, the acknowledgement signal including said request for retransmission, said request for reducing the transmission rate, and said request for changing the channel frequency.

9. A method according to claim 1, and further including the step of providing each data packet with an address code for a single receiving station.

10. A method according to claim 1, and further including the steps of providing each data packet with an address code for a plurality of receiving stations, and retransmitting each data packet or blocks within each packet until each addressed station ceases to request repeat transmissions.

* * * * *